US008267373B2

(12) United States Patent
Pierson

(10) Patent No.: US 8,267,373 B2
(45) Date of Patent: Sep. 18, 2012

(54) LOCKING NON-METALLIC SINGLE LEVER CONTROL

(76) Inventor: Robert Neil Pierson, Mora, MN (US)

( * ) Notice: Subject to any disclaimer, the term of this patent is extended or adjusted under 35 U.S.C. 154(b) by 411 days.

(21) Appl. No.: 12/660,284

(22) Filed: Feb. 23, 2010

(65) Prior Publication Data

US 2011/0203680 A1 Aug. 25, 2011

(51) Int. Cl.
*F16K 35/00* (2006.01)

(52) U.S. Cl. ............ 251/99; 251/93; 251/105; 251/231; 251/242; 74/473.23; 74/473.25

(58) Field of Classification Search .................... 251/89, 251/93, 98, 99, 105, 231, 235, 236; 74/471 R, 74/471 XY, 483 K, 523, 519, 522.5, 524, 74/526, 527, 529, 473.21–473.25; 137/596.12, 137/625.6
See application file for complete search history.

(56) References Cited

U.S. PATENT DOCUMENTS

| | | | | |
|---|---|---|---|---|
| 674,135 | A * | 5/1901 | Erickson | 137/635 |
| 1,344,554 | A | 6/1920 | Mentzer | |
| 1,401,093 | A | 12/1921 | McDaniels | |
| 1,898,140 | A * | 2/1933 | Peterson | 74/473.23 |
| 2,122,306 | A | 6/1938 | Volz et al. | |
| 3,031,898 | A * | 5/1962 | Eaton | 74/473.23 |
| 3,169,409 | A | 2/1965 | Babacz | |
| 3,304,953 | A | 2/1967 | Wickline et al. | |
| 4,057,701 | A | 11/1977 | Sisk et al. | |
| 4,075,907 | A | 2/1978 | Petrzelka | |
| 4,131,126 | A | 12/1978 | Chromik | |
| 4,206,602 | A | 6/1980 | Watson et al. | |
| 4,237,629 | A | 12/1980 | Schmidt | |
| 4,240,307 | A * | 12/1980 | Yamazaki et al. | 74/503 |
| 4,332,177 | A | 6/1982 | Andresen | |
| 4,473,141 | A * | 9/1984 | Mochida | 477/94 |
| 4,507,601 | A | 3/1985 | Andresen | |
| 4,574,286 | A | 3/1986 | Andresen | |

(Continued)

FOREIGN PATENT DOCUMENTS

FR 2255194 A1 7/1975

(Continued)

OTHER PUBLICATIONS

Drawings and promotional literature of Series 4000 Control Lever produced and offered for sale in Aug. 1991.

(Continued)

*Primary Examiner* — John K Fristoe, Jr.
*Assistant Examiner* — Marina Tietjen
(74) *Attorney, Agent, or Firm* — Michael A. Mochinski

(57) ABSTRACT

A single lever control for manually manipulating a hydraulic valve spool of a directional control valve, which comprises an elongate shaft encased within an outer casing and having first and second ends each being fixedly attached to an end cap and a pivot block, respectively. The outer casing comprising a cylindrical cup for housing a biasing element whereupon an applied upward force on the cylindrical cup causes the outer casing to move upwardly to the extent of lifting a latching member pivotally connected to the pivot block and releasing a locking mechanism. The mounting assembly comprising an adapter plate integrally connected to a vertical support member and having a large aperture for receiving a moveable stem associated with the hydraulic valve spool, an arrangement of which allows a valve-actuating stem associated with the pivot block to movably interact with the moveable stem as the single lever control is selectively manipulated.

20 Claims, 12 Drawing Sheets

U.S. PATENT DOCUMENTS

| | | | |
|---|---|---|---|
| 4,748,323 | A | 5/1988 | Holiday |
| 4,805,480 | A * | 2/1989 | Tsubouchi et al. ............. 74/503 |
| 4,912,997 | A | 4/1990 | Malcolm et al. |
| 5,576,704 | A | 11/1996 | Baker et al. |
| 5,653,420 | A | 8/1997 | Sell |
| 7,416,053 | B2 | 8/2008 | Chard et al. |
| 2004/0112160 | A1 | 6/2004 | Tsai et al. |

FOREIGN PATENT DOCUMENTS

| | | |
|---|---|---|
| GB | 1056178 | 1/1967 |
| GB | 1182188 | 2/1970 |
| GB | 1604618 | 12/1981 |

OTHER PUBLICATIONS

Drawing of Series 4300 Control Lever produced and offered for sale in Oct. 1992.

* cited by examiner

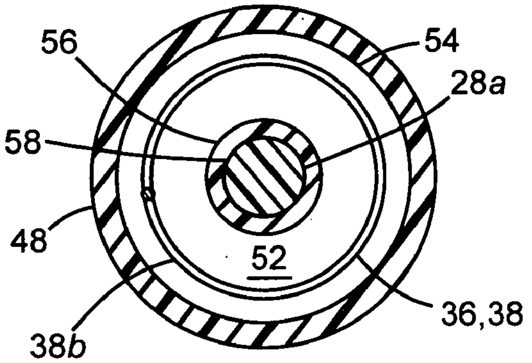
FIG. 8
FIG. 9
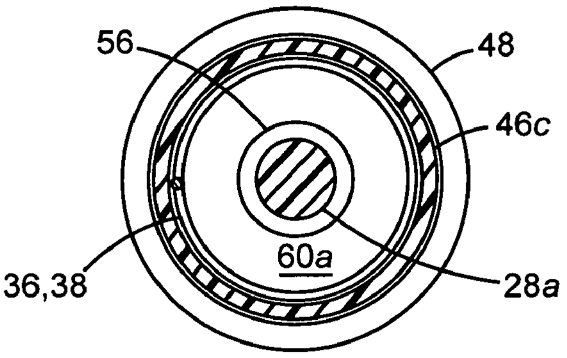
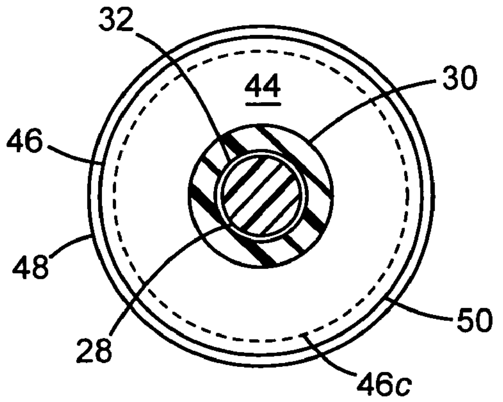
FIG. 10
FIG. 11
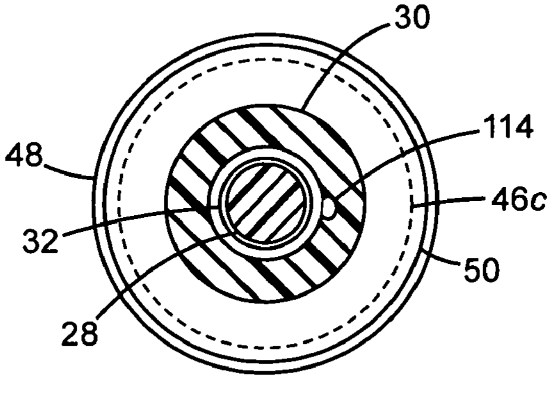

LOCKING NON-METALLIC SINGLE LEVER CONTROL

FIELD OF THE INVENTION

The present invention relates in general to a single lever control for use in manually manipulating a hydraulic valve spool of the type present in a directional control valve and commonly associated with hydraulically operated machinery. More specifically, the present invention serves as supplemental means in furthering one's safe operation of hydraulically operated machinery, particularly in regard to mitigating occurrences of injury or damage to property stemming from the unforeseeable contact and interaction thereof with an electrical source and/or inadvertent actuation of the lever control to cause unintended operation of working, hydraulic components associated therewith.

BACKGROUND OF THE INVENTION

Most of today's heavily equipped machinery, substantially to the likes of a front end bucket loader, an earth mover, and an excavator, to name a few, operate principally by means of hydraulic fluid flow sustainably operating under moderate to high pressures, typically in the area of 1000-6000 p.s.i. As with most machinery of this type, hydraulic fluid is pumped to a high pressure and transmitted throughout the machinery to various actuators particularly configured and suited to cause a working, hydraulic component to operate and perform work, such as moving a frontward bucket of a front end loader to a desirable upward or downward position, for example. A gasoline- or diesel-operated engine or an electric motor typically serve as means to power the hydraulic pump. Pressurized fluid, on the other hand, is preferentially controlled by means of one or more directional control valves each being equipped with hydraulic valve spools and distributed through a defined network of hoses and tubes. The attractiveness of hydraulic machinery is due in large part to the ample amount of power that can be transferred through the defined network of small tubes and flexible hoses leading to and from the hydraulic valve spools, actuators, reservoirs, and pumps which collectively contribute to the making of a hydraulic circuit. The hydraulic valve spool of one particular type noted in the art can be generally described as comprising a central (neutral) position maintained with springs. Depending on the manufacturer's design configuration, sliding the valve spool to a general fore position opens the valve to permit hydraulic fluid to flow to the actuator and from the actuator to the reservoir. Conversely, when the valve spool is allowed to return to a neutral (center) position, the actuator fluid paths are closed, locking the valve in position. Directional control valves are usually designed to be stackable, with one control valve serving each hydraulic cylinder and one fluid input supplying all the control valves in the stack. The valve spool positions noted above might be actuated by means of a mechanical lever control of the particular type corresponding to the present invention.

Associated with the configuration of the hydraulic circuit is a compilation of structural components, such as the bucket, track, frame, axles, and so forth, fabricated from metallic materials to further the structural integrity of the hydraulic machinery and offer durability for sustained long-term utilization and operation in the field. Given the presence of metallic-fabricated structural components with their associative conductive properties, there exists unforeseeable opportunities for unsafe operation of the hydraulic machinery while in the field. For instance, operation of a metal-tracked excavator or drilling machine while in the field with inappropriate marking of below-grade hazards, such as high powered electrical lines, and unforeseeable interaction and contact thereof with conductive structural components, may have profound impact on the equipment operator's health, perhaps to the extent of serious injury or even death from electrocution.

The art offers a variety of methods and devices for protecting the operator from such serious mishap, notably upon the instance the hydraulic machinery becomes an energized conductor by means of the noted inadvertent contact of the conductive structural components with an electrical source. The most simplistic form of protection might comprise outfitting the equipment operator with protective clothing fabricated with a non-conductive material, such as rubber-lined or insulated clothing, for example. However, any implementation of this level of protection may be inappropriate in some circumstances, particularly where one operates hydraulic machinery in warm or hot environments, among other uninviting situations. Other available protective measures may include safeguards integrated into and made part of the hydraulic machinery. For instance, in a boom truck aerial device, the operator is generally insulated from or isolated from electrical pathways by situating him/her in a non-metallic, workman's basket with further provisions of offering control mechanisms or levers and linkages selectively covered with or fabricated from non-conductive materials, whereas the main structural components of the aerial device, such as the boom, turret, and base, might be fabricated from steel or equivalent material to maintain adequate levels of structural strength. An example of this safeguard approach is illustrated in U.S. Pat. No. 7,416,053 issued to Chard, et al. and entitled "Isolation Mechanism for Electrically Isolating Controls of Boomed Apparatus," wherein portions of a control handle and associated linkages are fabricated from an electrically non-conductive material insofar to establish a dielectric gap or separation in between the control handle and conductive structural components, a configuration of which suffices to isolate the operator from deadly phase-to-phase or phase-to-ground electrical discharge occurring from inadvertent contact of the aerial device's boom tip with that of an electrical source. Although the safety mechanism present and described in Chard, et al. may adequately serve to protect the operator, particularly with respect to a boomed apparatus operating within a defined environment, its application may be viewed as design limiting and unsuitable for incorporation into other hydraulically operated machinery having unique design characteristics and build requirements.

In addition to the noted unforeseen electrical hazards, there may instances in the field where the equipment operator is momentarily distracted or becomes inattentive to the conditions for safe operation of the hydraulic machinery and inadvertently contacts one or more mechanical lever controls that correspondingly actuates one or more of the valve spools to cause working components to unintentionally operate. It is quite plausible in this case that any inadvertent actuation of control mechanisms of this type may set forth undesirable consequences, possibly to the extent of harming the equipment operator, others situated nearby, and property. The art does offer mechanisms or devices that effectively serve to mitigate inadvertent actuation of working components to some degree, one of which may consists of equipping the directional control valve with a spring that functionally serves to return the control lever and connected valve spool to a neutral, closed position, generally operating to the likes of a momentary switch commonly associated with the electrical arts. However, such configured mechanism may not be timely in preventing the undesirable event from occurring in the first place. In other words, the damage may have arisen to a point of no return.

Accordingly, there remains a need for a single lever control that provides for the manual operation of a hydraulic valve spool of the type present in a directional control valve and commonly associated with hydraulically operated machinery, particularly of which further serves to electrically isolate the operator from electrically charged pathways upon the unforeseen instance the conductive structural components of the hydraulic machinery contacts an electrical source and mitigates occurrences of inadvertent actuation of the directional control valve to cause unintended operation of working, hydraulic components, consequently of which may arise to injury to one or more persons situated nearby and/or damage to property.

BRIEF SUMMARY OF THE INVENTION

In order to overcome the numerous drawbacks apparent in the prior art, a single lever control has been devised for manually manipulating and operating a hydraulic valve spool of the type present in a directional control valve and commonly associated with various forms of hydraulically operated machinery, such as front end loaders, excavators, drilling machines, cranes, and so forth.

It is thus an object of the present invention to provide a single lever control that furthers the safe operation of the hydraulic machinery by means of electrically isolating an equipment operator from deadly phase-to-phase or phase-to-ground electrical discharges stemming from the inadvertent contact of conductive structural components of the hydraulic machinery with that of an electrical source.

It is an object of the present invention to provide a single lever control that is mechanically configured for adaptation to and suited to operate various forms of hydraulic valve spools of the type offered and made available by a variety of manufacturers.

It is thus an object of the present invention to provide a single lever control that supplements the safe operation of the hydraulic machinery by mitigating occurrences of inadvertent actuation of the directional control valve that can cause the hydraulic valve spool to open and permit working, hydraulic components of the hydraulic machinery to unintentionally operate to the extent of possibly causing injury to nearby persons and/or damage to property.

It is an object of the present invention to provide a single lever control that can effectively exist in a side-by-side, grouped configuration to correspond with a stackable arrangement of directional control valves without undue hindrance or interference from neighboring control valves, thus furthering the safe operation of the hydraulic machinery in the field.

It is thus an object of the present invention to provide a single lever control that offers top placement of a decal or label indicating valve control operability or capability for greater, enhanced visibility to the equipment operator, consequently contributing to reduced occurrences of inadvertent actuation of the control valve that may lead to unintended operation of one or more working, hydraulic components.

It is yet another object of the present invention to provide a single lever control which accomplishes the foregoing and other objects and advantages and which is economical, durable, and fully effective in performing its intended functions without unduly compromising the stock performance and operation of hydraulic machinery of the particular type commonly known and available in the art.

In accordance with the present invention a single lever control has been devised for manually manipulating and operating a hydraulic valve spool of the type present in a directional control valve and commonly associated with hydraulic machinery, the single lever control principally comprising a handle assembly having an elongate shaft encased within a non-metallic outer casing, the elongate shaft having first and second ends each being fixedly attached to a non-metallic end cap and a pivot block, respectively, the outer casing further comprising a cylindrical cup for housing and containing therewithin a biasing element whereupon an applied force acting upwardly on the cylindrical cup, directionally toward the end cap, correspondingly causes the outer casing to move upwardly to the extent of lifting a latching member pivotally connected to the pivot block and releasing a locking mechanism, particularly being suited to provide for pivotal movement of the pivot block about a lever pin extending therethrough and associated with a vertical support member of a mounting assembly, the mounting assembly further comprising an adapter plate integrally connected to the vertical support member and having one or more mounting holes for receiving therethrough fasteners suited to connect the adapter plate to a select mountable portion of the directional control valve and a large aperture for receiving and accepting therethrough a moveable stem associated with the hydraulic valve spool, an arrangement of which allows a valve-actuating stem associated with the pivot block to engage and interact with the moveable stem as the single lever control is selectively moved in a general rearward or forward manner.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which:

FIG. 8 is a cross sectional view of the preferred embodiment of the present invention taken on line 8-8 of FIG. 13 illustrating an end cap having an annular seat for accepting therein a second end of a spring;

FIG. 9 is a cross sectional view of the preferred embodiment of the present invention taken on line 9-9 of FIG. 13 illustrating a cylindrical cup and an end cap having an annular seat for accepting therein a second end of a spring;

FIG. 10 is a cross sectional view of the preferred embodiment of the present invention taken on line 10-10 of FIG. 13 illustrating a bottom member of a cylindrical cup and an elongate shaft encased within a non-metallic outer casing;

FIG. 11 is a cross sectional view of the preferred embodiment of the present invention taken on line 11-11 of FIG. 13 illustrating a second end of an elongate shaft housed within a lower end of a non-metallic outer casing;

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as a device for manually manipulating and operating a hydraulic valve spool of the type present in a directional control valve and commonly associated with hydraulically operated machinery, particularly being configured and suited to electrically isolate the operator from electrically charged pathways upon the unforeseen instance the conductive structural components of the hydraulic machinery contacts an electrical source and becomes an energized conductor, with the further added provision of mitigating occurrences of inadvertent actuation of the directional control valve to cause unintended operation of working, hydraulic components.

Figure 1:
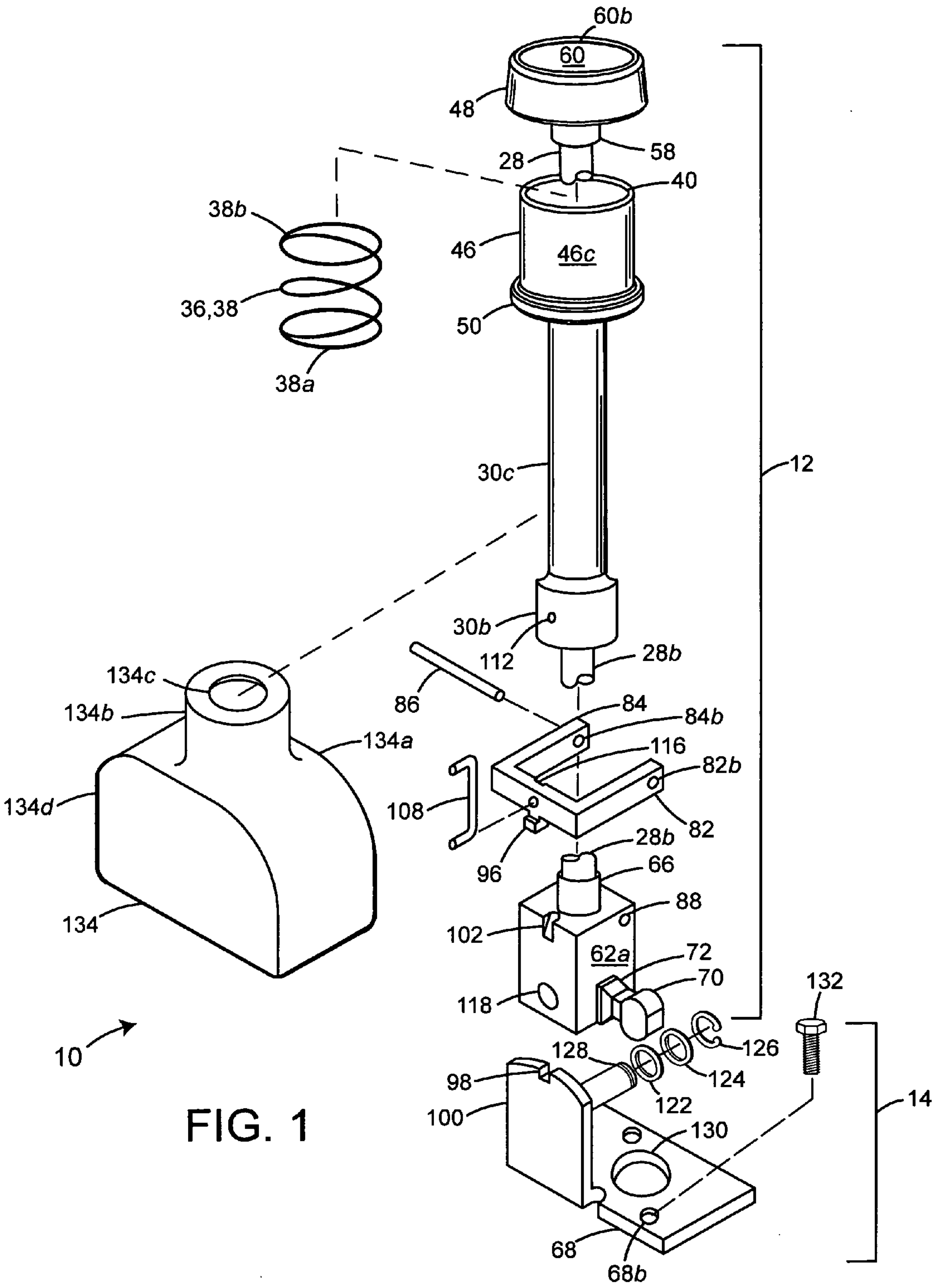
FIG. 1 is a disassembled view of a preferred embodiment of the present invention illustrating a handle assembly apart from a mounting assembly and a flexible boot.
Figure 2:
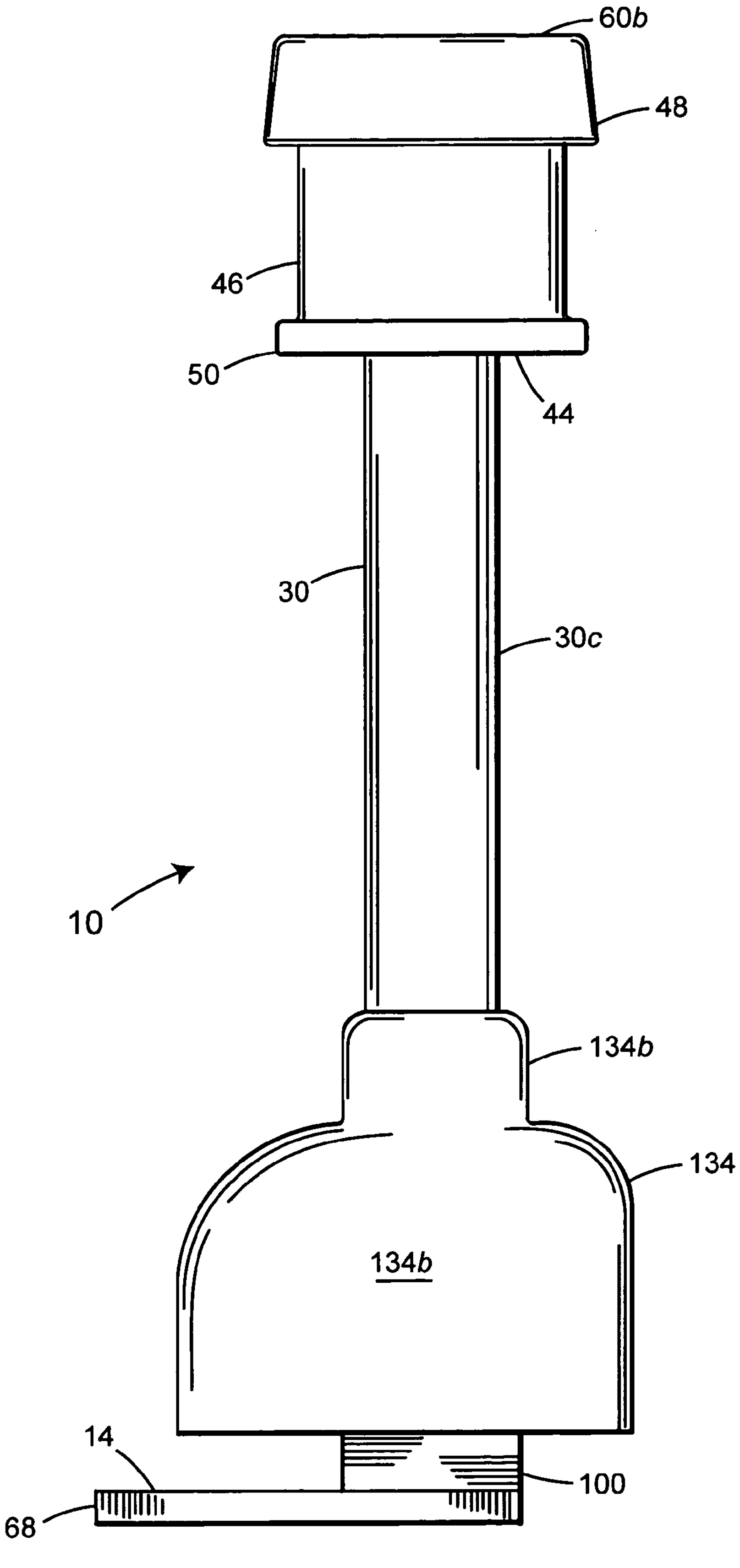
FIG. 2 is a right side elevational view of a preferred embodiment of the present invention illustrating a handle assembly pivotally connected to a mounting assembly partially covered with a flexible boot.

Referring now to FIGS. 1 and 2, there is shown generally at 10 a single lever control primarily comprising handle and mounting assemblies 12, 14 collectively configured to isolate and protect an operator of hydraulic machinery from electrically charged pathways and mitigate inadvertent actuation of a directional control valve 16 under the particular circumstances discussed hereinbefore. It is expressly noted herein that the mounting assembly 14 of the particular type described for and included in the present invention may comprise one or more specific configurations to correspond to a variety of directional control valves being offered by many of today's leading manufacturers. One form of directional control valve, primarily for purposes of describing and illustrating the present invention, may comprise one or more single hydraulic valve spools 18 each having separable capacity to slidably move back and forth within an interior chamber 20 integrally made part of the directional control valve. Depending on the manufacturer's design and configuration, the directional control valve of the type generally depicted in FIG. 3 may further comprise one or more inlet and outlet openings 22 extending through an outer shell 24 of the directional control valve for connecting thereto a defined network of tubing and piping leading to and from a variety of components of a hydraulic circuit, such as a reservoir, pump, working hydraulic cylinder, and so forth. In facilitating the movement and transfer of pressurized hydraulic fluid within a typical hydraulic circuit known in the art, the hydraulic valve spool 18 is slidably positioned within the interior chamber to generally permit one or more passages (not shown) distinctively associated with and present in the hydraulic valve spool to align with any number or combination of the inlet and outlet openings 22. A movable stem 26 integrally connected to the hydraulic valve spool and extending outwardly partway from the directional control valve's shell 24 serves as principal means for manually manipulating the hydraulic valve spool to a desirable open or closed position. The single lever control 10 of the present invention effectively serves this stated purpose as well as effectuating other ancillary utilitarian benefits expressed herein.

Figure 4:
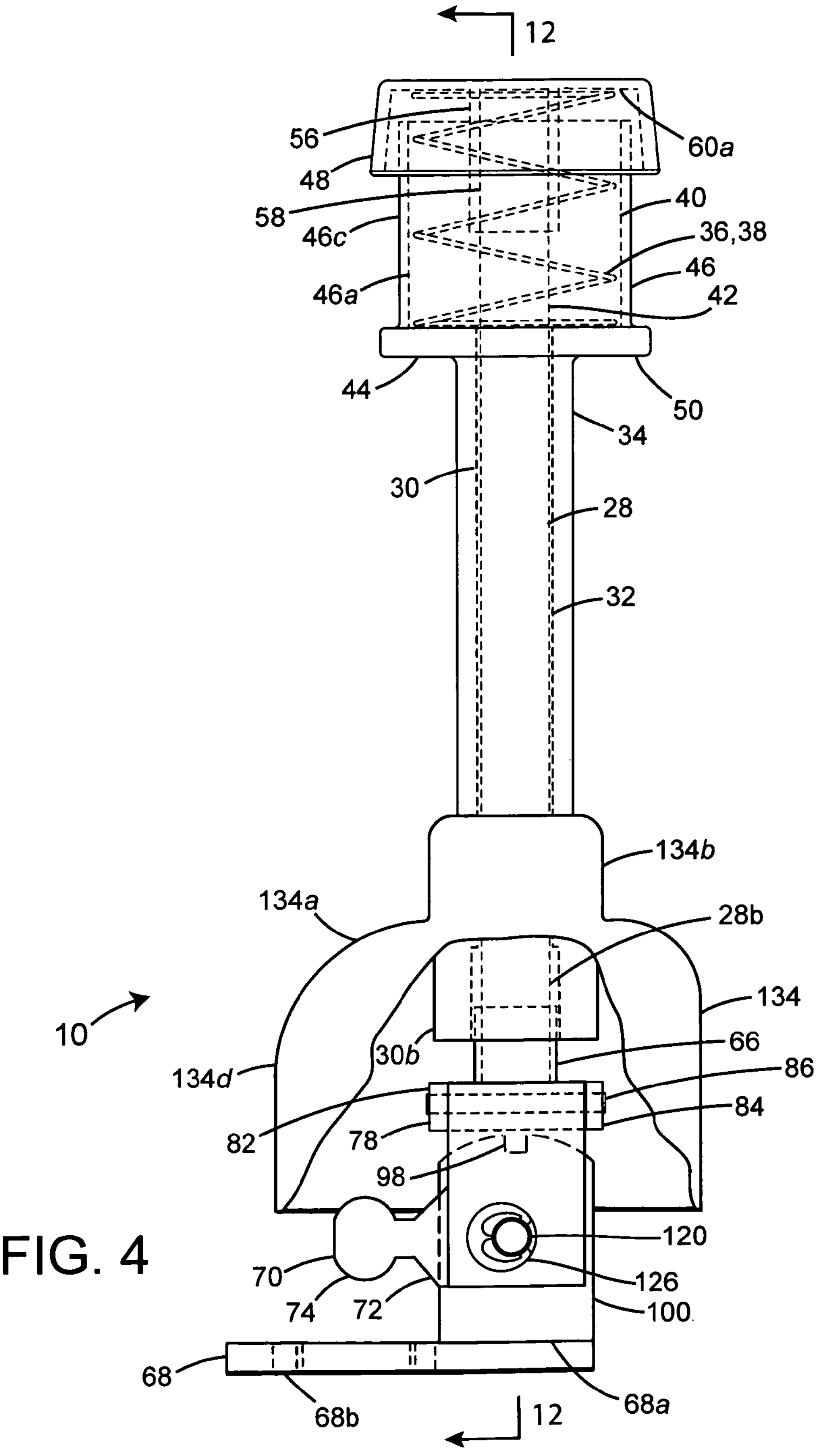
FIG. 4 is a right side elevational view of the preferred embodiment of the present invention illustrating a mounting assembly pivotally connected to a handle assembly comprising an outer casing covering an elongate shaft having a first end fixedly attached to an end cap.
Figure 5:
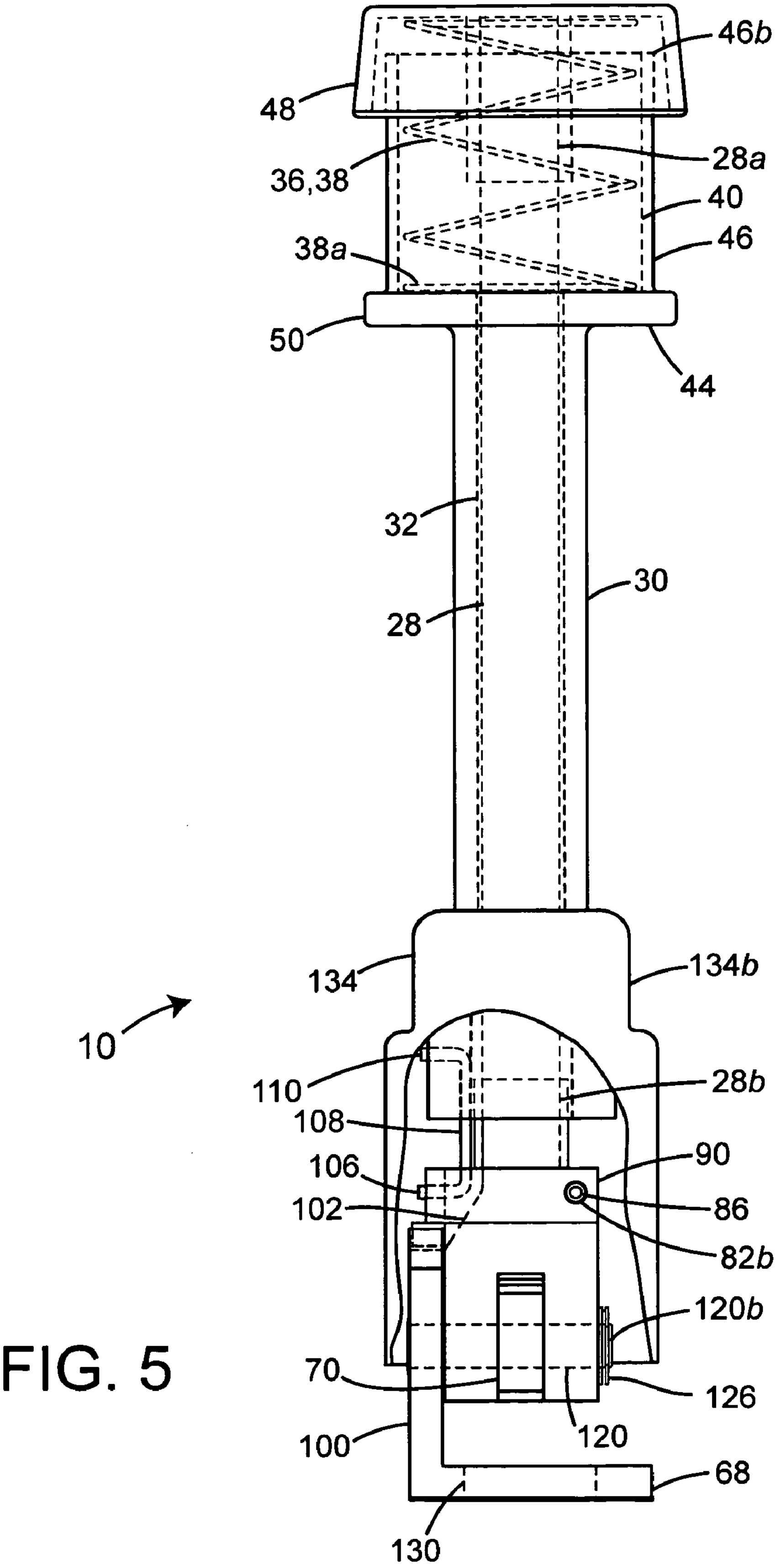
FIG. 5 is a front elevational view of the preferred embodiment of the present invention illustrating a mounting assembly pivotally connected to a handle assembly comprising an outer casing covering an elongate shaft having a first end fixedly attached to an end cap and a second fixedly connected to a pivot block.
Figure 12:
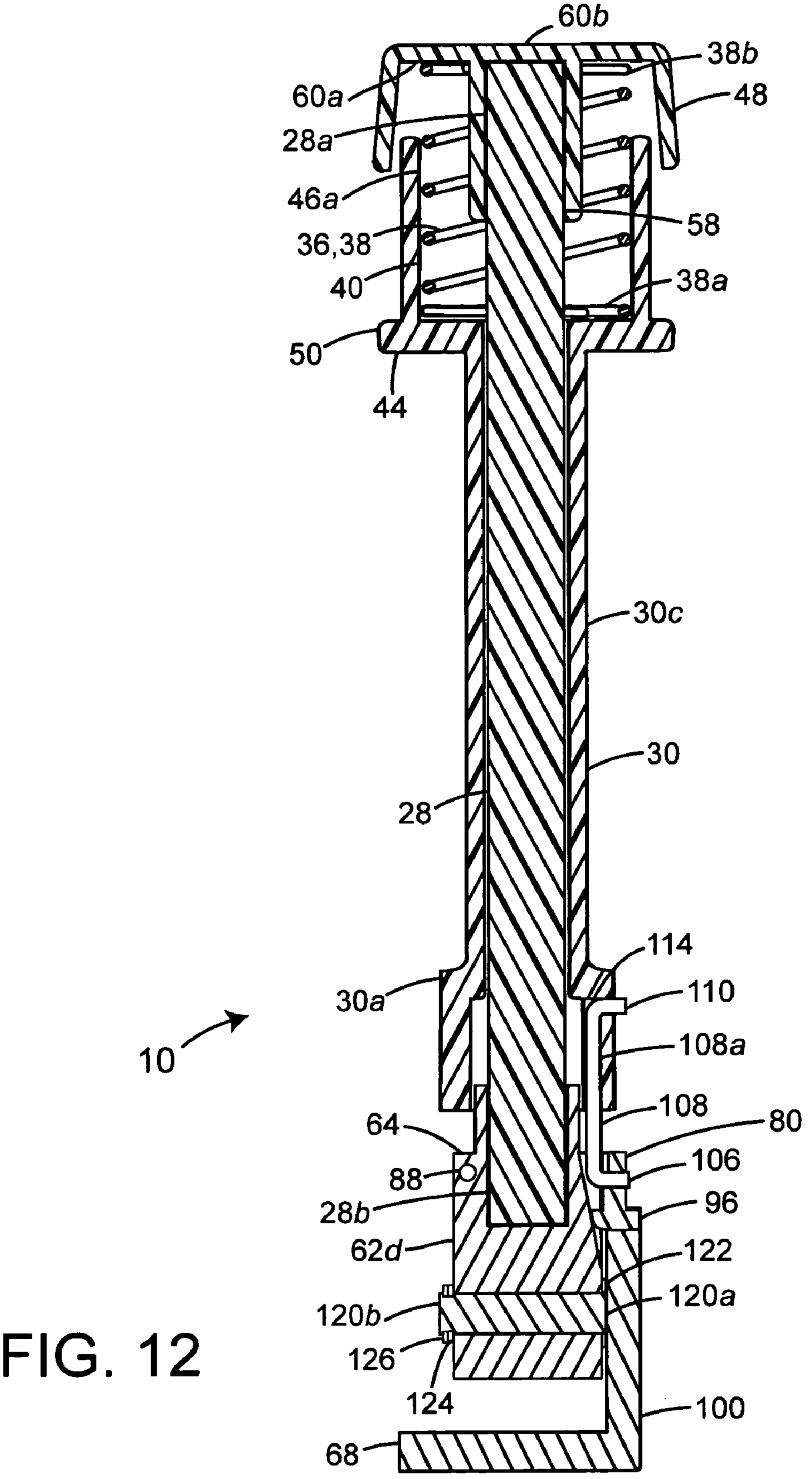
FIG. 12 is a side cross sectional view of the preferred embodiment of the present invention taken on line 12-12 of FIG. 4 illustrating an elongate shaft positioned interiorly within an outer casing and having a first end fixedly attached to an end cap and a second end fixedly connected to a pivot block.

The handle assembly 12 is specifically shown in FIG. 4 to comprise an elongate shaft 28 of cylindrical form having a predetermined diameter and length and first and second ends 28*a*, 28*b*. Covering and encasing approximately the entire length of the elongate shaft is a non-metallic outer casing 30 configured with an inner cylindrical bore 32, preferentially corresponding to the approximate shape and length of the elongate shaft 28, but having a cross-sectional diameter slightly greater than that of the cross-sectional diameter of the elongate shaft to permit unhindered, slidable movement longitudinally thereabout. An upper end 34 of the outer casing 30, as preferably shown in FIG. 5, comprises a biasing element 36 that is effective to bias the outer casing such that a force effective to overcome the biasing force is necessary to move the outer casing away from the second end 28*b* and toward the first end 28*a* of the elongate shaft 28, as directionally designated by arrow U in FIG. 6. As a result, the biasing element in turn is singularly effective to bias the outer casing 30 generally toward the second end of the elongate shaft upon releasing any applied force to the biasing element, as directionally designated by arrow D in FIG. 7. While virtually any biasing element can be used, in an exemplary embodiment of the type shown in FIGS. 8 and 9, the biasing element 36 takes on the form of a spring 38 situated and retained within an annular space 40 formed by an exposed portion 42 of the elongate shaft extending upwardly through a bottom member 44 of a cylindrical cup 46 and interior sidewall 46*a* thereof. In accord with this arrangement, the first end 28*a* of the elongate shaft is relatively positioned to extend beyond the height of the cylindrical cup's interior sidewall and an upper rim 46*b* integrally associated therewith, particularly being configured to allow access thereto for fixedly attaching a non-metallic end cap 48 to the first end of the elongate shaft as illustrated in FIG. 4. Further included as part of the cylindrical cup 46, as shown in FIGS. 10 and 11, is an underside ledge 50 integrally associated with the bottom member 44 and extending radially outward from an outer sidewall 46*c* of the cylindrical cup, a structure of which supplementally serves in facilitating application of force to the biasing element. In like form to the annular space 40 associated with the cylindrical cup depicted in FIG. 12, the end cap 48 comprises an annular seat 52 substantially formed by an interior cylindrical wall 54 of the end cap and an outer sidewall 56 of a centralized socket 58, wherein the centralized socket is geometrically configured to correspond with and accept therein the first end 28*a* of the elongate shaft 28. In assembled form, notably in relation to the biasing element 36 shown in FIGS. 12 and 13, first and seconds ends 38*a*, 38*b* of the spring are configured to fit within and engage the annular space 40 and annular seat 52 of the cylindrical cup 46 and end cap 48, respectively, particularly in such manner to securely hold thereinbetween the spring to prevent its disfiguration and displacement therefrom while interim forces act on the biasing element to achieve and permit rearward or forward motion of the single lever control 10. In further respects of assembly, as shown in FIG. 12, the interior cylindrical wall 54 of the end cap slightly abuts the outer sidewall 46*c* of the cylindrical cup, with the upper rim 46*b* thereof generally accompanying the annular seat 52 alongside the placement of the second end 38*b* of the spring. Accordingly, as the biasing element 36 accepts an applied force, the upper rim 46*b* will generally contact an underside area 60*a* of a planar member 60 of the fixed end cap 48, thus limiting the extent by which the outer casing 30 and integrally connected cylindrical cup 46 can longitudinally travel about and upwardly along the elongate shaft 28. Supplementing the configuration of the planar member 60 is an upper facing surface 60*b* having general planar characteristics for accepting thereon and affixing thereto a variety of labels designating operative functionality of the single lever control 10, particularly being useful in mitigating inadvertent actuation of the single lever control during field operation of the hydraulic machinery.

Figure 6:
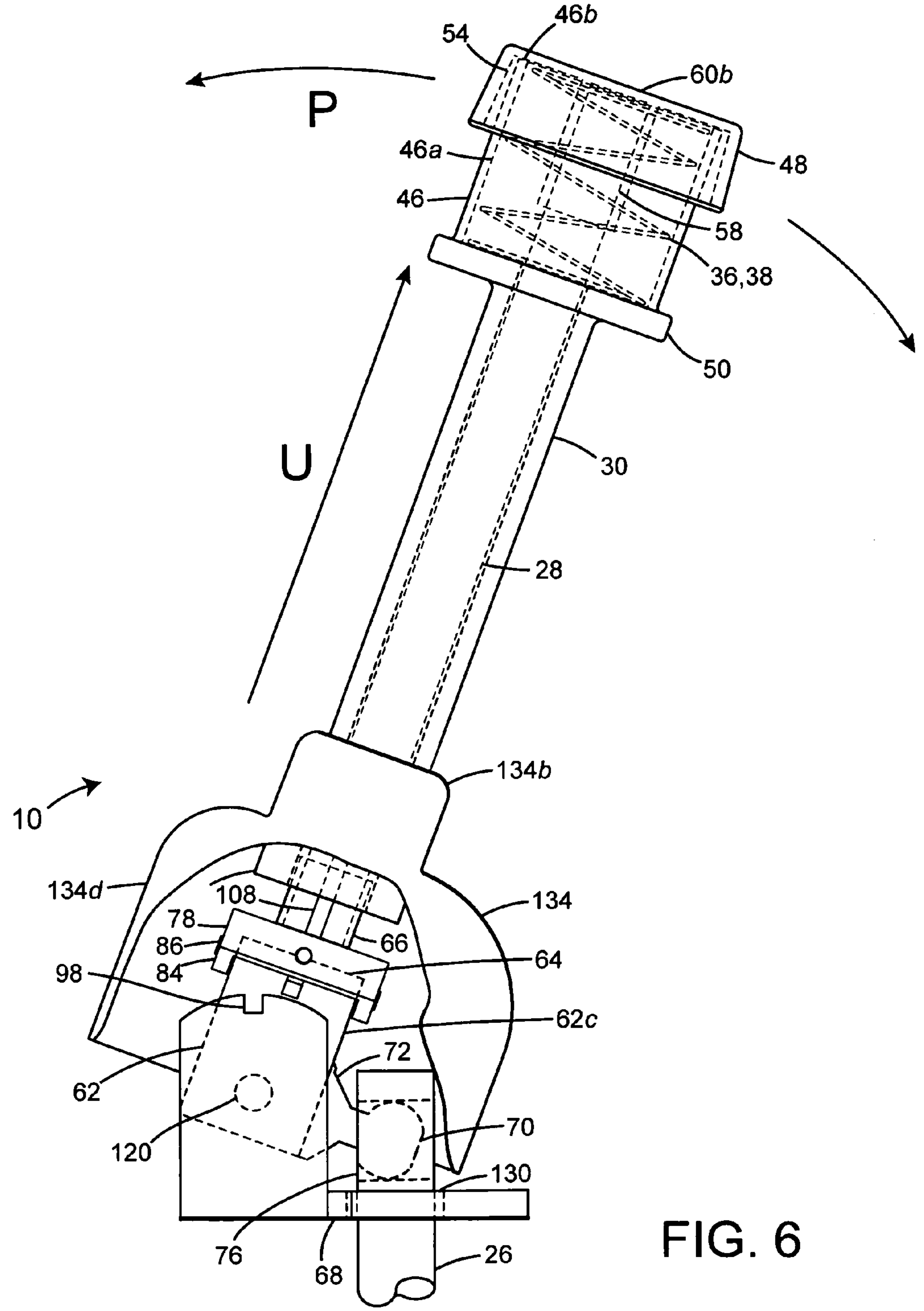
FIG. 6 is a left side elevational view of the preferred embodiment of the present invention illustrating a handle assembly pivotally connected to a mounting assembly and forwardly moved along path P to permit a valve-actuating stem to engage and interact with a movable stem integrally part of a hydraulic valve spool.
Figure 7:
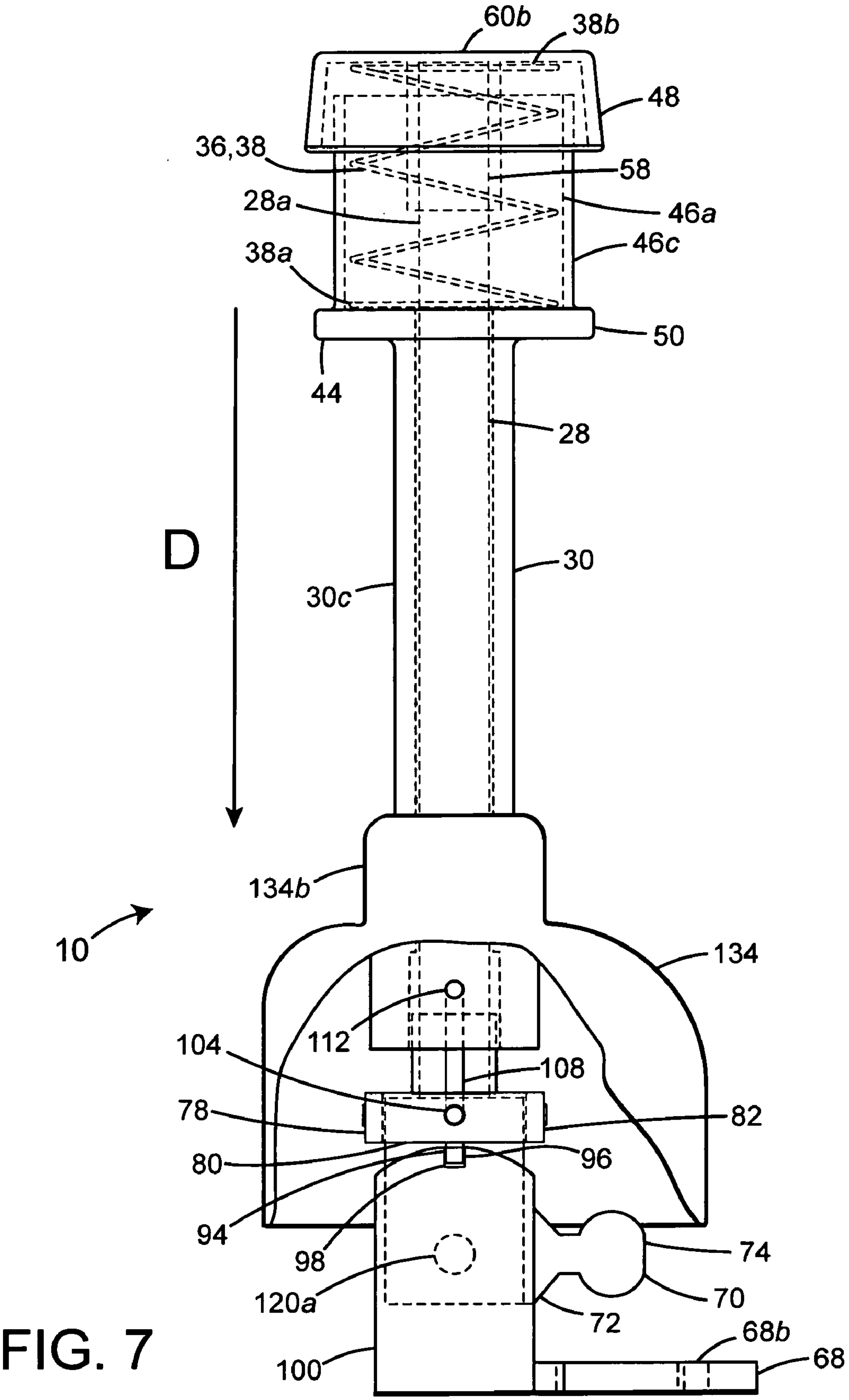
FIG. 7 is a left side elevational view of the preferred embodiment of the present invention illustrating a mounting assembly pivotally connected to a handle assembly comprising an outer casing covering an elongate shaft having a first end fixedly attached to an end cap and a second fixedly connected to a pivot block.
Figure 14:
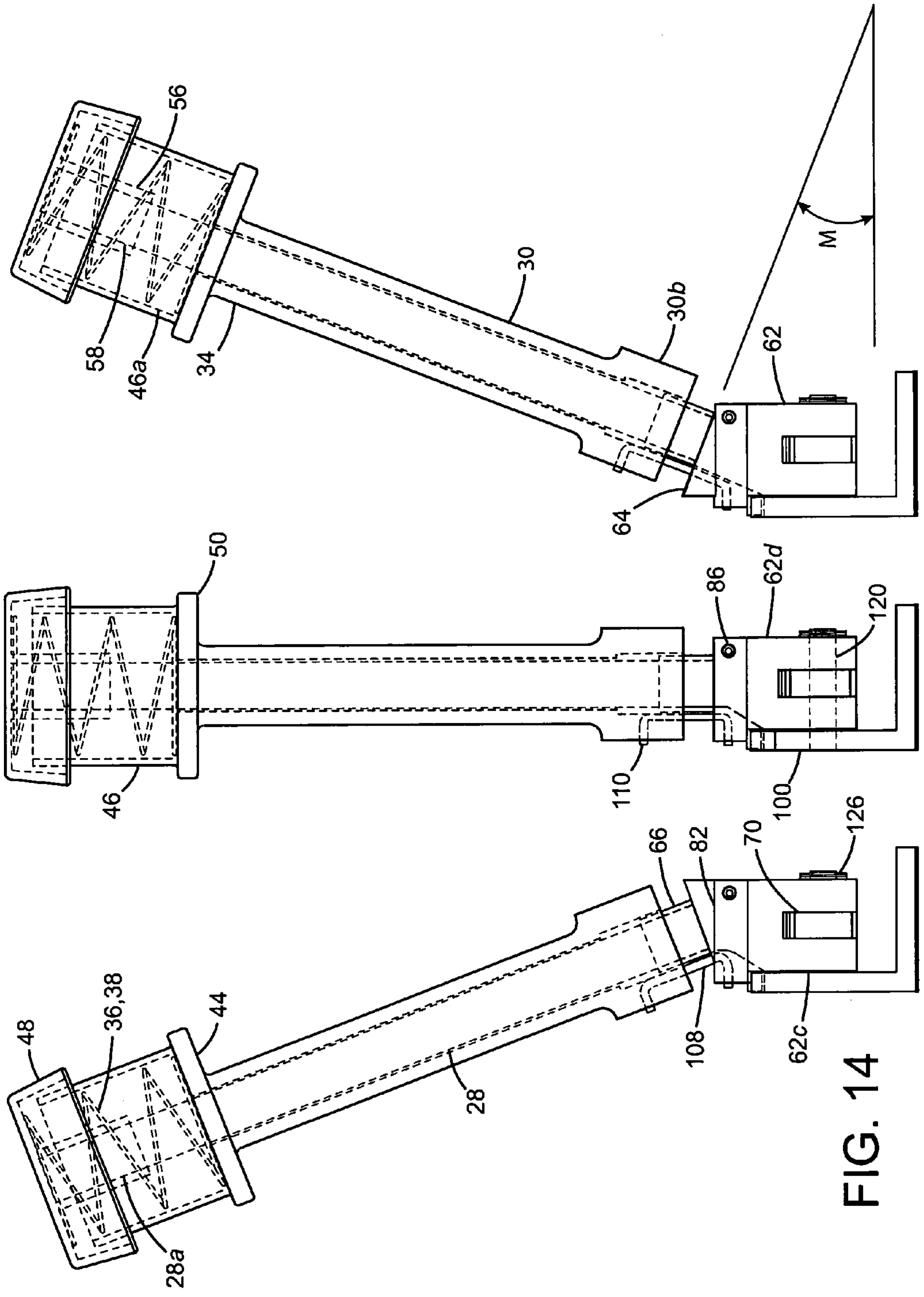
FIG. 14 is a front elevational view of the preferred embodiment of the present invention illustrating three single lever controls in a side-by-side configuration to accommodate a stackable arrangement of directional control valves.

Referring now to FIGS. 7 and 12, the second end 28*b* of the elongate shaft is shown connected to a pivot block 62 that permits the handle assembly 12 to pivotally travel relatively to the mounting assembly 14 as a force is being applied to the biasing element 36 and the single lever control is generally moved in a rearward or forward manner along path P in FIG. 6. The pivot block as shown in FIG. 1 preferably comprises an upper planar member 64 having an upward-positioned socket 66 for accepting therein and fixedly attaching the second end 28*b* of the elongate shaft, with the upper planar member being preferably orientated perpendicular to the elongate shaft 28 to establish an overall linear relationship of the handle assembly 12. In an alternative embodiment of the present invention, as illustrated in FIG. 14, the upper planar member 64 may comprise an angular relationship M relatively to the positioning of an adapter plate 68 of the mounting assembly 14 to establish an overall non-linear relationship of the handle assembly 12, purposefully to allow the handle assembly to be angularly positioned relatively apart from neighboring single lever controls 10. Accordingly, a grouped or a side-by-side configuration of single lever controls 10 is feasibly possible, permissively to the extent of conforming to the stackable arrangement of directional control valves 16 for expanded, effective operation and control of the hydraulic machinery. Further associated with a forward face 62*a* of the pivot block is a valve-actuating stem 70 that extends outwardly therefrom a predetermined distance to engage and interact with the movable stem 26 associated with the hydraulic valve spool 18 of the directional control valve. The valve-actuating stem may comprise a myriad of configurations to generally conform to the manufacturers' specific geometric configurations of the movable stem, more particular in relation to the available mechanical means for manually manipulating the hydraulic valve spool to a desirable position. However, for purposes of illustrating one exemplary embodiment of the present invention, the valve-actuating stem 70 is generally shown in FIG. 6 to comprise a pedestal structure 72 having an integral protuberance 74 extending outwardly therefrom with a rounded or tapered appearance such as to allow it to slidably travel about and traverse within a receptacle 76 of the movable stem without undue hindrance, particularly upon the handle assembly 12 being moved in a general rearward or forward direction along path P in FIG. 6 to permit the valve-actuating stem 70 to directionally manipulate the movable stem 70 of the hydraulic valve spool 18 either upwardly or downwardly, respectively.

Figure 13:
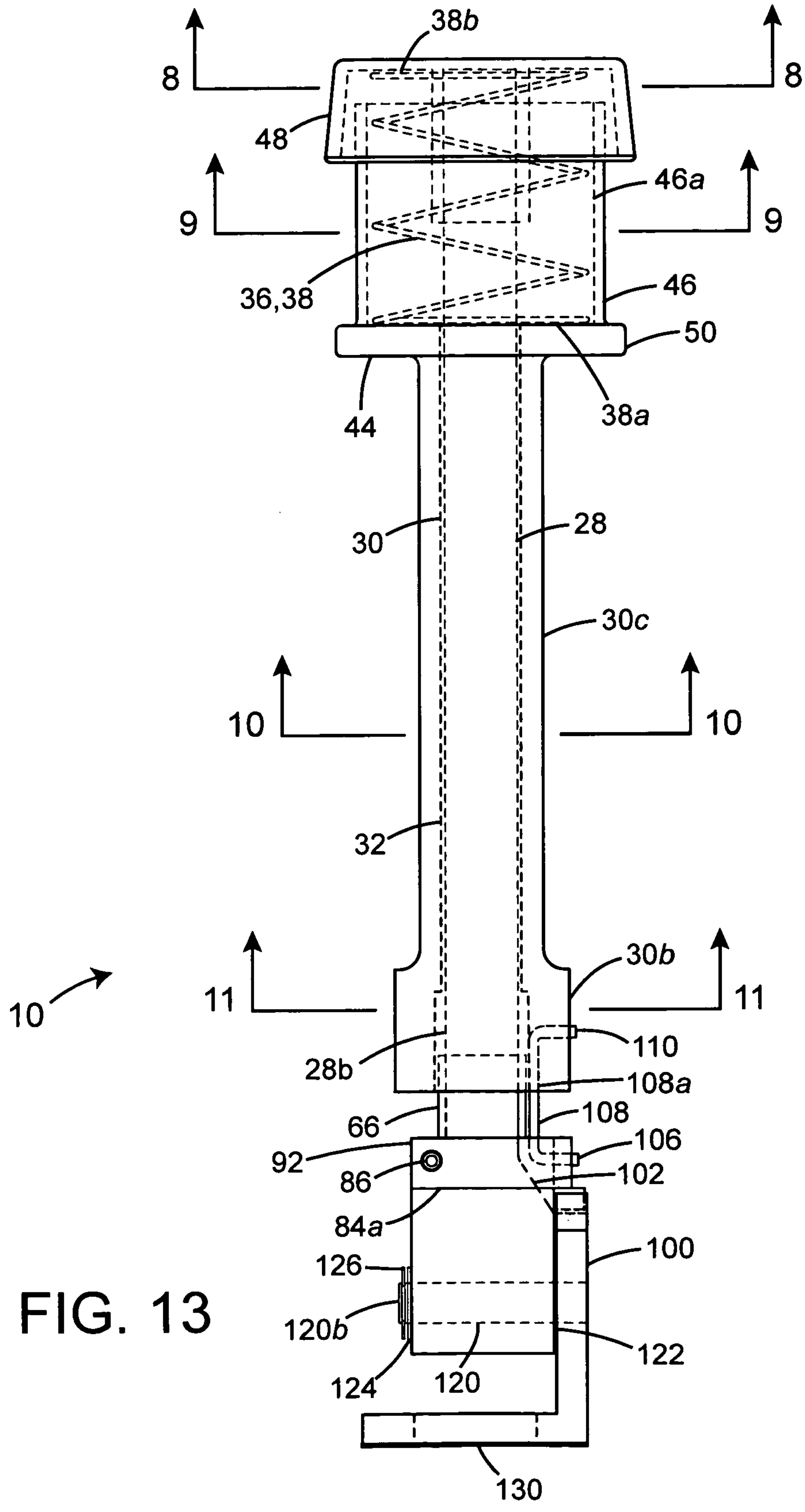
FIG. 13 is a rear elevational view of the preferred embodiment of the present invention illustrating a mounting assembly pivotally connected to a handle assembly comprising an outer casing covering an elongate shaft having a first end fixedly attached to an end cap.

Operating conjunctively with the valve-actuating stem of the pivot block is means for locking and securing the handle assembly 12 relatively to the mounting assembly 14 to mitigate occurrences of inadvertent rearward or forward pivotal movement of the single lever control 10 and subsequent actuation of the directional control valve. Locking and securing means is preferentially shown in FIGS. 1 and 6 to comprise a latching member 78 generally of u-shaped configuration having an intermediate support section 80 integrally connected to and situated in between first and second arms 82, 84 with corresponding first and second ends 82*a*, 84*a* being diametrically positioned apart from one another. In particular to the preferred embodiment, the latching member 78 is positioned adjacent to and below the upper planar member 64, with the first and second ends 82*a*, 84*a* thereof being pivotally connected to forward and rearward faces 62*a*, 62*b* of the pivot block, respectively, or more specifically, holes 82*b*, 84*b* extending through the first and second ends and an arm bore 88 selectively aligned therewith and extending through front and rear upper corners 90, 92 of the pivot block slidably receive a rod 86, a configuration of which facilitates free pivotal movement of the latching member and latching and unlatching of a locking mechanism 94 without undue hindrance. As shown in FIG. 7 the locking mechanism 94 comprises a pin 96 generally extending outwardly from below the intermediate support section 80, preferably midway in between each of the arms 82, 84. The pin is more specifically configured to fit within and engage a slot 98 formed into a vertical support member 100 associated with the mounting assembly 14 of the particular type shown in FIG. 7 and moves within a slot track 102 integrally associated with the pivot block 62 to adequately guide the locking mechanism 94 as it is being pulled in an upwardly manner to correspond with the applied force acting on the biasing element 36. In furthering the operation of the locking mechanism in a manner consistent with the preferred embodiment, the intermediate support section 80 supplementally comprises a first aperture 104 generally positioned above the pin 96 for which is suited to accept and fit therein a lower hooked end 106 of a link 108. In like manner, an upper hooked end 110 of the link, of particular form depicted in FIG. 13, is configured to fit within and engage a second aperture 112 extending through a lower end 30*a* of the outer casing 30. Hence, in accord with this configuration, any applied force to the biasing element 36 subsequently causes the outer casing to effectuate corresponding upward movement of the latching member 78 that enables the release of the pin 96 from its mating position within the slot 98. In order to limit the extent of binding or twisting that may occur between the outer casing and latching mechanism upon operation of the single lever control 10, the lower end 30*a* of the outer casing, as shown in FIGS. 11 and 12, is interiorly configured with a groove 114 of geometric proportion to spatially accommodate a mid-sectional portion 108*a* of the link, a structure sufficing to establish continuity of the hooked ends 106, 110. In instances of constructing the preferred embodiment, the lower end of the outer casing comprises a thicker wall portion 30*b* than that of a midsection 30*c* of the outer casing to accommodate fabrication of the groove without weakening the integrity of the casing's structure particular to this location. Furthermore, the intermediate support section may comprise an indent 116 preferentially positioned above the aperture 104 and pin 96 to spatially accommodate the mid-sectional portion 108*a* of the link and prevent binding of the link at it correspondingly travels upwardly and downwardly with the movement of the outer casing 30.

In providing for pivotal movement of the handle assembly 12 relatively to the mounting assembly 14, the pivot block 62 shown in FIG. 1 preferably comprises a bore 118 generally extending perpendicularly through left and right sideward members 62*c*, 62*d* and parallel to forward and rearward faces 62*a*, 62*b* thereof, the bore of which being configured to accept therein a lever pin 120 having an inward end 120*a* fixedly attached to and extending perpendicularly outward from the vertical support member 100 of the mounting assembly. In assembled form, substantially to the likes shown in FIG. 5, the pivot block 62 is slidably positioned about the lever pin after being first accommodated by a first set of spacers 122 being situated in between the left sideward member 62*c* and vertical support member, a configuration of which further promotes adequate clearance thereinbetween and unhindered pivotal movement of the pivot block about the lever pin. A second set of spacers 124 is also shown in FIG. 1, specifically being located in between the right sideward member 62*d* and a locking, open-ended washer 126 that is adaptably suited to fit within an annular groove 128 associated with an outward end 120*b* of the lever pin. By means of this configuration, lateral movement of the pivot block apart from the vertical support member 100 as well as from the lever pin 120 is particularly minimized as the handle assembly 12 is moved rearwardly or forwardly to control the single hydraulic valve spool 18 of the directional control valve 16.

Figure 3:
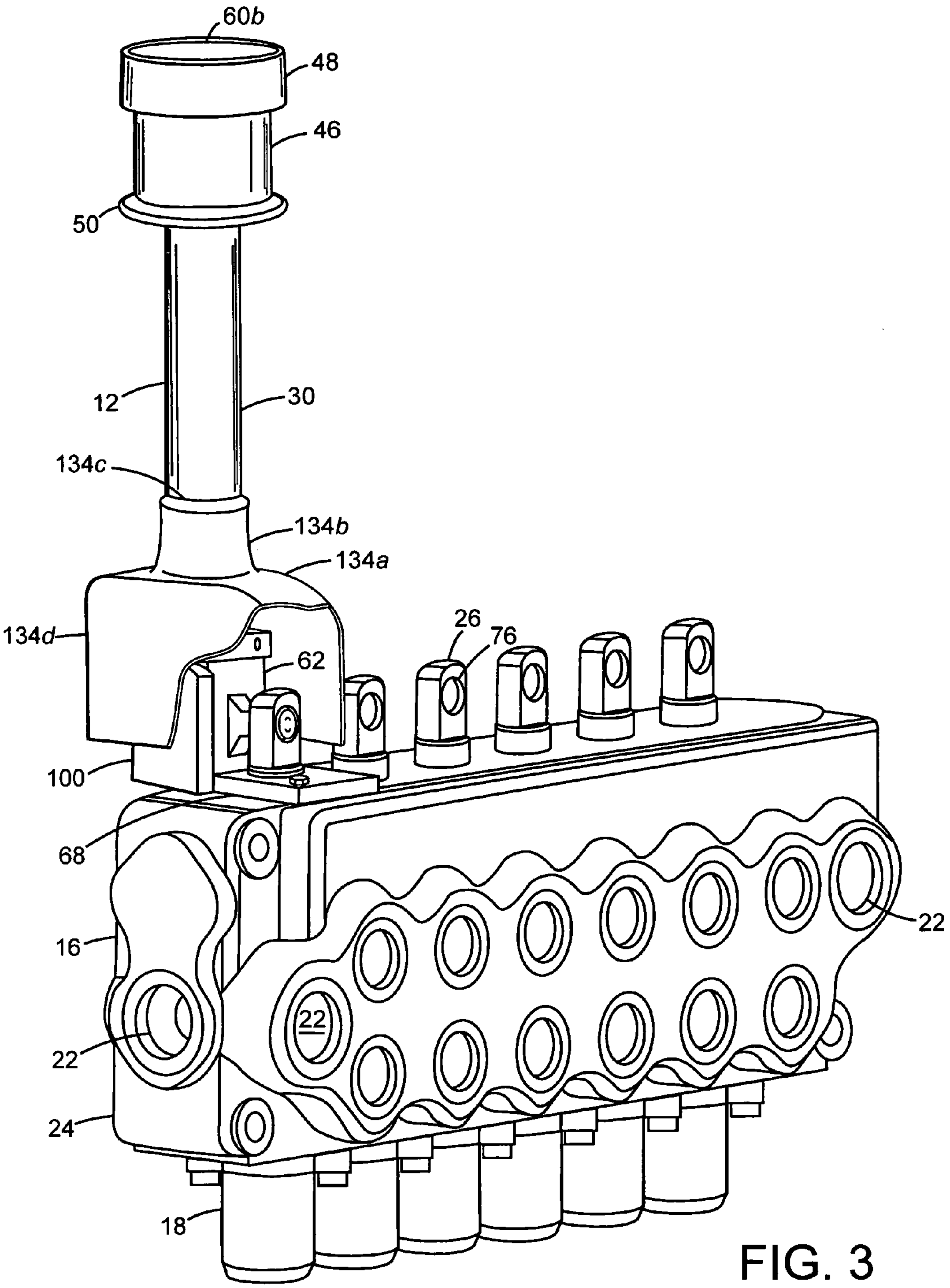
FIG. 3 is a front perspective view of the preferred embodiment of the present invention illustrating a mounting assembly positioned and mounted atop a directional control valve having a movable stem integrally part of a hydraulic valve spool.
Figure 15:
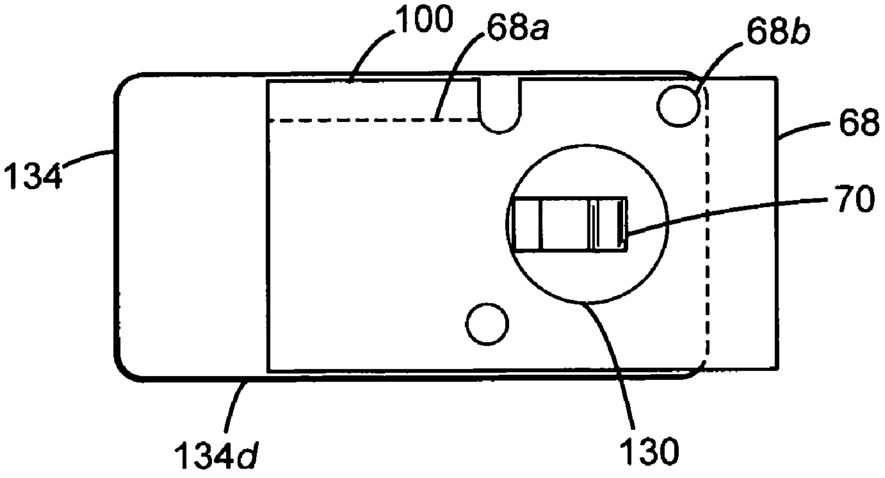
FIG. 15 is a bottom plan view of the preferred embodiment of the present invention illustrating a valve-actuating stem positioned above a large aperture extending through an adapter plate of a mounting assembly.
Figure 16:
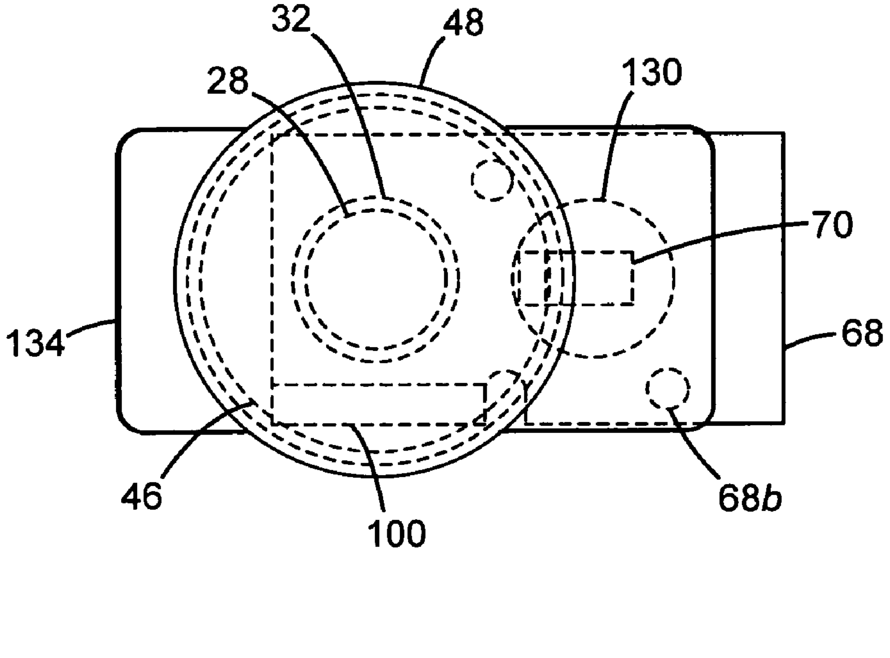
FIG. 16 is a top plan view of the preferred embodiment of the present invention illustrating an end cap fixedly attached to a first end of an elongate shaft and positioned above a flexible boot protectively covering a portion of a mounting assembly.

In furthering the attachment of the single lever control 10 to the directional control valve, the adapter plate 68 of the mounting assembly 14 is shown in FIG. 3 to fit about and over a select mountable portion of the directional control valve. In particular, the adapter plate 68, as illustrated in the exemplary embodiment of the present invention, comprises a geometric configuration most resembling a rectangle, with an edge portion 68*a* thereof being suited to fixedly attach thereto the vertical support member 100 in perpendicular fashion, substantially as shown in FIG. 4. However, like the valve-actuating stem 70 in terms of its adaptability, the adapter plate may comprise one or more configurations that are most suited to accommodate the structure and unique design characteristics associated with the mountable portion of the directional control valve 16. Accordingly, in this regard, the adapter plate as exemplarily depicted in FIG. 15 may comprise a large aperture 130 extending therethrough to permit passage and accommodate the positioning of the moveable stem 26 of the hydraulic valve spool, mainly to the extent for allowing the valve-actuating stem to gain accessibility to and engage the moveable stem and subsequently actuate and control the directional control valve to a pre-select operable position. In securing the mounting assembly 14 to the directional control valve in a manner most consistent with the preferred embodiment, the adapter plate 68 is further shown in FIG. 16 to comprise one or more mounting holes 68*b* exclusively provided for accepting an equivalent number of bolts 132 or similar forms of fasteners available in the art. In protecting operable components most associated with the moveable stem of the hydraulic valve spool, a portion of the handle assembly 12 and more fully the mounting assembly 14 is covered or encased with a flexible boot 134. The boot, as shown in FIG. 1, generally comprises a top 134*a* with an integrated neck 134*b* extending upwardly therefrom and an opening 134*c* centralized among four sidewalls 134*d* that drape downwardly over the mounting assembly, the opening being of sufficient diametric size to slidably fit about the midsection 30*c* of the outer casing 30 while allowing friction to hold it in place at a preselect position, preferentially at or near an area where the midsection joins the thicker wall structure 30*b* of the outer casing, as depicted in FIG. 6.

It can be seen from the foregoing that there is provided in accordance with this invention a simple and easily operated device that furthers the safe operation and control of hydraulic machinery, particularly being configured and suited to electrically isolate the operator from electrically charged pathways upon the unforeseen instance the conductive structural components of the hydraulic machinery contacts an electrical source and becomes an energized conductor. Moreover, the single lever control 10 comprises unique functional characteristics most suited to mitigate occurrences of inadvertent actuation of the directional control valve that may arise to unintended operation of working, hydraulic components and subsequently lead to injury to nearby persons and/or damage to property. It is obvious that the components comprising the single lever control 10 may be fabricated from a variety of materials, providing such selection or use of materials possess the capacity to withstand forces acting thereon throughout its duration of use in manually manipulating the hydraulic valve spool 18 of the type commonly associated with the directional control valve 16. Accordingly, it is most desirable, and therefore preferred, to construct the outer casing 30, elongate shaft 28, and end cap 48 of the handle assembly 12 from a rigid, non-metallic material such as fiberglass, nylon or polypropylene, to name a few most readily available in the art. Aluminum, steel or an equivalent material, which specifically possess physical properties of strength and rigidity, effectively serve as suitable material types to construct the pivot block 62, and mounting assembly 14, preferentially to the extent of ensuring sustained and reliable use of the single lever control 10.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. A single lever control for manually manipulating a movable stem of a hydraulic valve spool commonly associated with a directional control valve, said lever control comprising, in combination:

a handle assembly having an elongate shaft with first and second ends and an outer casing having upper and lower ends and an inner cylindrical bore for slidably accepting therein said elongate shaft, said upper end having means for supporting a biasing element effective for biasing said outer casing relatively about said elongate shaft;

a mounting assembly having a vertical support member integrally connected to an adapter plate configurably arranged to fit about and over a select mountable portion of the directional control valve, said adapter plate having a large aperture extending therethrough to permit passage of the moveable stem, said vertical support member having a lever pin fixedly attached thereto and extending perpendicularly outward therefrom;

a pivot block having an upper planar member integrally comprising an upward-positioned socket for accepting therein and fixedly attaching said second end of elongate shaft, forward and rearward faces, and left and right sideward members, said forward face having a valve-actuating stem extending outwardly therefrom a predetermined distance to engage and interact with the movable stem extending through said large aperture, said pivot block having a bore generally extending parallel to said forward and rearward faces for slidably accepting therein said lever pin;

means for locking and securing said handle assembly relatively to said mounting assembly to prevent said valve-actuating stem from movably interacting with the movable stem; and means for linking said lower end of outer casing with said locking and securing means to effectuate coordinating movement of each while biasing forces act on said biasing element.

2. A single lever control as set forth in claim 1, wherein said supporting means comprises a cylindrical cup integrally connected to said upper end of outer casing and an end cap positioned atop thereof and connected to said first end of elongate shaft collectively serving to house and retain said biasing element.

3. A single lever control as set forth in claim 2, wherein said biasing element comprises a spring having first and second ends.

4. A single lever control as set forth in claim 3, wherein said cylindrical cup and said end cap each comprises an annular space and annular seat for accepting and receiving said first and second ends of spring, respectively.

5. A single lever control as set forth in claim 2, wherein said end cap comprises a centralized socket for accepting and fixedly attaching therein said first end of elongate shaft and an interior cylindrical wall.

6. A single lever control as set forth in claim 5, wherein said cylindrical cup comprises an upper rim and said end cap comprises a planar member having an underside area and an upper facing surface for accepting thereon and affixing thereto a variety of labels designating operative functionality, whereupon a compressive force applied to said biasing element establishes momentary contact between said upper rim and said underside area and disengages locking and securing means to permit pivotal movement of said handle assembly about said lever pin.

7. A single lever control as set forth in claim 1, wherein said locking and securing means comprises a latching member generally of u-shaped configuration having an intermediate support section integrally connected to and situated in between first and second arms diametrically positioned apart from one another, said first and second arms each having an end pivotally connected to said forward and rearward faces of pivot block, respectively.

8. A single lever control as set forth in claim 7, wherein said vertical support member comprises a slot and said latching member comprises a locking mechanism having a pin generally extending outwardly from below said intermediate support section midway in between each of said first and second arms to fit within and engage said slot.

9. A single lever control as set forth in claim 8, wherein said pivot block comprises an arm bore extending in between said forward and rearward faces for accepting therein a rod to hold said first and second arms, respectively, and a slot track to guide said locking mechanism as said first and second arms pivotally move about each of their respective ends.

10. A single lever control as set forth in claim 7, wherein said linking means comprises a link having a mid-sectional portion connected to and situated in between upper and lower hooked ends, said intermediate support section comprising a first aperture for receiving therein said lower hooked end, said lower end of outer casing comprising a second aperture for receiving therein said upper hooked end.

11. A single lever control as set forth in claim 10, wherein said lower end of outer casing comprises a groove and said intermediate support section comprises an indent each of geometric proportion to spatially accommodate said mid-sectional portion of link.

12. A single lever control as set forth in claim 1, further comprising first and second set of spacers, said lever pin comprising an outward end having an annular groove for accepting therein a locking, open-ended washer for securing said pivot block relatively to said lever pin, said first set of spacers being situated in between said vertical support member and said left sideward member of pivot block, said second set of spacers being situated in between said right sideward member of pivot block and said locking, open-ended washer.

13. A single lever control as set forth in claim 1, further comprising a flexible boot having a top with an integrated neck extending upwardly therefrom and an opening centralized among four sidewalls draping downwardly therefrom to cover and protect said mounting assembly, said opening being of sufficient diametric size to slidably fit about said outer casing for frictional retention at a preselect position.

14. A single lever control as set forth in claim 1, wherein said upper planar member is angularly configured relatively to the positioning of said adapter plate of mounting assembly to establish an overall non-linear relationship of said handle assembly.

15. A single lever control as set forth in claim 1, wherein said valve-actuating stem comprises a pedestal structure having an integral protuberance extending outwardly therefrom with a general rounded appearance to permit unobstructed travel relatively within a receptacle of the movable stem.

16. A single lever control as set forth in claim 2, wherein said end cap, said elongate shaft, and said outer casing integrated with said cylindrical cup are fabricated from a non-metallic material.

17. A single lever control for manually manipulating a movable stem of a hydraulic valve spool commonly associated with a directional control valve, said lever control comprising, in combination:

a handle assembly having a non-metallic elongate shaft with first and second ends and a non-metallic outer casing having upper and lower ends and an inner cylindrical bore for slidably accepting therein said elongate shaft;

a spring having first and second ends, said spring being effective for biasing said outer casing relatively about said elongate shaft;

a cylindrical cup integrally connected to said upper end of outer casing and a non-metallic end cap positioned atop thereof and connected to said first end of elongate shaft collectively serving to house and retain said spring;

a mounting assembly having a vertical support member integrally connected to an adapter plate configurably arranged to fit about and over a select portion of the directional control valve, said adapter plate having a large aperture extending therethrough to permit passage of the moveable stem, said vertical support member having a lever pin fixedly attached thereto and extending perpendicularly outward therefrom;

a pivot block having an upper planar member integrally comprising an upward-positioned socket for accepting therein and fixedly attaching said second end of elongate shaft, forward and rearward faces, and left and right sideward members, said forward face having a valve-actuating stem extending outwardly therefrom a predetermined distance to engage and interact with the movable stem extending through said large aperture, said pivot block having a bore generally extending parallel to said forward and rearward faces for accepting therein said lever pin;

a latching member generally of u-shaped configuration having an intermediate support section integrally connected to and situated in between first and second arms diametrically positioned apart from one another, said first and second arms each having an end pivotally connected to said forward and rearward faces of pivot block, respectively; and a link having a mid-sectional portion connected to and situated in between upper and lower hooked ends, said intermediate support section comprising a first aperture for receiving therein said lower hooked end, said lower end of outer casing comprising a second aperture for receiving therein said upper hooked end.

18. A single lever control as set forth in claim 17, wherein said vertical support member comprises a slot and said latching member comprises a locking mechanism having a pin generally extending outwardly from below said intermediate support section midway in between each of said first and second arms to fit within and engage said slot, said pivot block comprising a bore extending in between said forward and rearward faces for accepting therein a rod to hold said first and second arms, respectively, and a slot track to guide said locking mechanism as said first and second arms pivotally move about each of their respective first and second ends.

19. A single lever control as set forth in claim 17, wherein said end cap comprises a centralized socket for accepting and fixedly attaching therein said first end of elongate shaft and an upper facing surface for accepting thereon and affixing thereto a variety of labels designating operative functionality, said cylindrical cup comprising an upper rim and said end cap comprising a planar member having an underside area, whereupon a compressive force applied to said spring establishes momentary contact between said upper rim and said underside area and disengages said locking mechanism to permit pivotal movement of said handle assembly about said lever pin.

20. A single lever control for manually manipulating a movable stem of a hydraulic valve spool commonly associated with a directional control valve, said lever control comprising, in combination:

a handle assembly having a non-metallic elongate shaft with first and second ends and a non-metallic outer casing having upper and lower ends and an inner cylindrical bore for slidably accepting therein said elongate shaft;

a spring having first and second ends, said spring being effective for biasing said outer casing relatively about said elongate shaft;

a cylindrical cup integrally connected to said upper end of outer casing and having an upper rim and an annular space for accepting and receiving therein said first end of spring;

a non-metallic end cap positioned atop said cylindrical cup and having a centralized socket for accepting and fixedly attaching therein said first end of elongate shaft and an annular seat for accepting and receiving therein said second end of spring;

a mounting assembly having a vertical support member integrally connected to an adapter plate configurably arranged to fit about and over a select portion of the directional control valve, said adapter plate having a large aperture extending therethrough to permit passage of the moveable stem, said vertical support member having a slot and a lever pin fixedly attached thereto and extending perpendicularly outward therefrom;

a pivot block having forward and rearward faces, left and right sideward members, and an upper planar member integrally comprising an upward-positioned socket for accepting therein and fixedly attaching said second end of elongate shaft, said forward face having a valve-actuating stem extending outwardly therefrom a predetermined distance to engage and interact with the movable stem extending through said large aperture, said pivot block having a slot track, a bore generally extending parallel to said forward and rearward faces for accepting therein said lever pin, and an arm bore extending in between said forward and rearward faces for accepting therein a rod;

a latching member generally of u-shaped configuration having an intermediate support section integrally connected to and situated in between first and second arms diametrically positioned apart from one another, said first and second arms each having an end pivotally connected to said rod positioned about said forward and rearward faces of pivot block, respectively, said latching member comprising a locking mechanism having a pin generally extending outwardly from below said intermediate support section midway in between each of said first and second arms to fit within and engage said slot; and a link having a mid-sectional portion connected to and situated in between upper and lower hooked ends, said intermediate support section comprising a first aperture for receiving therein said lower hooked end, said lower end of outer casing comprising a second aperture for receiving therein said upper hooked end.

* * * * *